United States Patent [19]

Henslee et al.

[11] Patent Number: 4,648,954

[45] Date of Patent: Mar. 10, 1987

[54] MAGNESIUM ALUMINUM SPINEL IN LIGHT METAL REDUCTION CELLS

[75] Inventors: Walter W. Henslee, Lake Jackson; Stanley J. Morrow, Richwood; John S. Lindsey, Missouri City, all of Tex.

[73] Assignee: The Dow Chemical Company, Midland, Mich.

[21] Appl. No.: 792,955

[22] Filed: Oct. 30, 1985

Related U.S. Application Data

[63] Continuation of Ser. No. 569,082, Jan. 9, 1984, abandoned.

[51] Int. Cl.$^4$ .......................... C25C 3/08; C25B 11/04; C21B 7/02; C04B 35/02
[52] U.S. Cl. ............................. 204/243 R; 204/291; 501/120; 266/286
[58] Field of Search ............... 204/243 R, 291, 70, 204/290 R, 67; 501/120; 266/280, 286

[56] References Cited

U.S. PATENT DOCUMENTS

| | | |
|---|---|---|
| 2,805,167 | 9/1957 | McCreight et al. ............... 501/120 |
| 3,401,226 | 9/1968 | Renkey ............... 266/286 X |
| 3,530,209 | 9/1970 | Ho ............... 501/120 X |
| 3,711,397 | 1/1973 | Martinsons ............... 204/291 X |
| 3,813,225 | 5/1974 | Cook ............... 266/280 X |
| 4,039,401 | 8/1977 | Yamada et al. ............... 204/290 R |
| 4,240,891 | 12/1980 | Bannister ............... 501/120 X |
| 4,400,431 | 8/1983 | Henslee et al. ............... 501/120 X |
| 4,448,654 | 5/1984 | Spangenberg et al. ............... 204/67 X |
| 4,478,693 | 10/1984 | Ray ............... 204/70 X |

FOREIGN PATENT DOCUMENTS

| | | | |
|---|---|---|---|
| 8101717 | 6/1981 | European Pat. Off. ............ 204/291 |
| 0047389 | 4/1980 | Japan ............... 204/291 |
| 0125289 | 9/1980 | Japan ............... 204/243 R |

*Primary Examiner*—Donald R. Valentine

[57] ABSTRACT

There is disclosed a unique substantially non-reactive refractory material suitable for use as a material of construction for various component parts of an electrolytic light metal, particularly magnesium, production cell. The non-reactive refractory material is comprised of a magnesium aluminum spinel. When used in block form the blocks may be joined together by use of a phosphate-spinel mortar.

4 Claims, No Drawings

MAGNESIUM ALUMINUM SPINEL IN LIGHT METAL REDUCTION CELLS

This is a continuation of application Ser. No. 569,082, filed Jan. 9, 1984, now abandoned.

BACKGROUND OF THE INVENTION

The production of light metals, e.g. magnesium and aluminum, by the electrolytic winning from their molten salts, is old and well documented. Similarly are the maintenance problems of such cells.

Refractories for use in magnesium reduction cell service must function in an extremely hostile environment. The agents potentially involved in chemical attack on the materials of construction include the molten salts, HCl, chlorine gas, steam and molten metal, all at temperatures above about 650° C. Since magnesium metal is one of the more active metals in the periodic table toward oxidation it poses a significant problem in selecting materials of construction for production cells even when substantially free of the elements in a production cell, as for example molten metal handling and casting operations, and care must be taken in selecting material of construction because of the oxidation and reaction potential of these light metals. For example, refractories which survive in one area of the cell are unable to withstand direct contact with the molten or gaseous metal and vice versa.

In addition to the harsh chemical environment, large thermal gradients are maintained across refractories. Also, rapid thermal cycling occurs in operations such as feeding, metal removal and refractory repair. These thermal stresses accompanied by the physical intrusion of bath salts and vapors into the body of the refractory and the heater lines which, as the penetration deepens, undergoes numerous freeze-thaw cycles, act to fracture and break up refractory structures. It has been observed over the many years of evaluation and analytical investigation of refractory materials particularly in magnesium reduction cell service that these three factors, chemical attack, thermal shock and physical intrusion of salts, work in concert to degrade cell refractory materials. The various combinations of these elements in the different zones of the cell accelerate the physical deterioration of the materials of construction. Conventional cell materials are steel, graphite, alumina, beta alumina and alumina-silica. Steel and graphite are subject to oxidation and high heat conductivity. Therefore, where possible alumina and alumnia-silica constitute most of the refractory shapes, castables, mortars and the like used as components in cell construction.

During investigations of cell refractory failures, it was discovered that while the cell is producing magnesium metal at the electrode surface, it is producing aluminum metal and silicon metal in certain parts of the refractory system when such are composed of alumina and/or silica. Depending on its local environment, the silica undergoes reduction to the elemental state and may remain as Si° or may alloy with magnesium to form magnesium silicide. All types of alumina investigated when exposed to molten magnesium convert, albeit not uniformly but locally, to aluminum metal and magnesium aluminum oxide spinel, $MgAl_2O_4$ and if silicon is present the aforesaid reactions also occur. Futher, as in the case of silicon, some part of the aluminum will combine with elemental magnesium to form the usual alloys. It was initially thought that this reaction was driven by the electrochemical nature of the cell. It has now been discovered, however, that this is not the case. Experiments in which several different types of aluminas ($\alpha$, $\beta$ and $\delta$) were exposed to molten magnesium metal or magnesium vapors outside a cell environment produced the same general result, for example, with regards to the alumina content of the refractory—$MgAl_2O_4+Al°$. The extent of the reaction appears to depend upon the crystal form and surface area exposed. Thus, alumina with low surface areas and more stable crystal form, such as high density alpha aluminum oxide, are the most resistant to attack but even these will undergo some reaction in time.

A few researchers have reported similar reactions between aluminum metal and MgO refractories, Judd, M. S. and Nelson, J. A., "INTERACTION OF MOLTEN ALUMINUM AND MAGNESIUM OXIDE REFRACTORIES", Ceramic Bulletin, 55 No. 7 (1976) page 643; "ALUMINUM ALLOYS CONTAINING MAGNESIUM AND ALUMINUM OXIDE", Lindsay, J. G., Bakker, W. T. and Dewing, E. W., J. American Ceramic Society, 47 (1964) pages 90–94; and Jynge, H. and Motzfeldt, K. "REACTIONS BETWEEN MOLTEN MAGNESIUM AND REFRACTORY OXIDES", Electrochimica Acta, 25 (1980) page 139 reporting on the reaction of magnesium with aluminum oxide or amuninosilicates at temperatures higher than those normally used in a reduction cell. However, there seems to be no information in the literature concerning the exposure of refractories containing magnesium aluminum oxide spinel to molten metals nor their use in magnesium service or even a suggestion to that effect.

BRIEF DESCRIPTION OF THE INVENTION

In accordance with the present invention there is disclosed a material for use in electrolytic light metal production cells, particularly magnesium production cells. The novel materials used in the present invention are composed of a magnesium aluminum oxide spinel. The spinel disclosed may be utilized in any of the several different refractory forms, as well as mortars, as the refractory components of a light metal electrolytic cell.

In accordance with the present invention refractory components may be preformed into a shape using a sinterable (reactive) form of the spinel with or without more highly calcined or sintered forms of spinel, all fully disclosed in U.S. Pat. No. 4,400,431, and Ser. No. 451,122, now abandoned, filed Dec. 20, 1982 by W. W. Henslee et. al. entitled CERAMIC COMPOSITES WITH IMPROVED THERMAL RESISTANCE which are incorporated in its entirety herein, or other aggregate materials and binders, which produces a ceramic or a chemical bond on sintering of the pressed, cast or extruded body. Alternately, the shape can be produced by fusion casting techniques, including the well known solid solutions of MgO and $Al_2O_3$ in appropriate proportions to produce a spinel, especially where large blocks are desired, as well as surface conversion as an aluminum oxide refractory material as disclosed in U.S. Pat. No. 4,382,997.

A mortar for use with bricks and blocks as well as forming castables has been produced using mixtures of reactive and non-reactive (dead burned) spinel powders with acid phosphates. The reactive spinel/acid phosphate system can also be used as the binder to produce a vibratable mix or castable in manufacturing chemically bonded shapes. In such cases aggregates of spinel are preferred but other suitable inert refractory material (e.g. fused alumina) also may be employed. The exact nature of the reactive spinel, as well as the manner and formula for phosphate bonding systems are fully disclosed in copending U.S. patent application Ser. No. 451,351 filed Dec. 20, 1982, now U.S. Pat. No. 4,459,156 entitled PHOSPHATE BONDING OF REACTIVE SPINELS FOR USE AS REFRACTORY MATERIALS by W. W. Henslee, et al. which is incorporated in their entirety herein.

Other techniques for forming objects are disclosed in U.S. Pat. No. 4,394,455 and Ser. No. 296,605, now U.S. Pat. No. 4,439,532 filed Aug. 26, 1981 by G. W. Strother, Jr. entitled CASTING STEP ANODE FROM SPINELS AND SPINEL REFRACTORIES also incorporated in their entirety herein.

It is understood that the term spinel as used herein applies to stoichiometric spinel $MgAl_2O_4$, as well as to the well known solid solution compositions of magnesium aluminum oxide.

DETAILED DESCRIPTION OF THE INVENTION

In a representative example of the application of the present invention, a laboratory scale electrolytic magnesium cell was constructed using a one liter quartz beaker with suitable insulating refractory around the exterior. A cage was fashioned from a quartz rod to hold small refractory blocks for the tests between the cathode and the anode. The cell was charged with the usual mixture of molten salts (e.g. $MgCl_2$, NaCl, KCl) and a dc voltage applied to the electrodes. Magnesium metal is produced in such a test cell with periodic feeding of the cell and metal removal from it. This provides an accelerated test due to the proximity of the refractory materials and the electrodes.

In such tests, pure spinel materials, as either dense blocks with or without spinel phosphate mortar joints, typically survived more than 100 hours of continuous operation. Most commercially available alumina and alumina-silica materials and mortars based thereon failed completely in less than 50 hours, often with extensive blackening. Analytical data showed the reaction chemistry disclosed above does occur with respect to alumina and alumina-silicate species, pure aluminum and silicon metals were produced as well as the magnesium oxidation product in the form of a spinel.

The present invention is also applicable as refractory elements of the cell as described in U.S. Pat. No. 3,755,099, wherein an outer layer of insulating refractory was overlaid with a layer of a dense alumina having interspersed among it a spinel brick of the present invention each bonded with a phosphate spinel mortar, as described in copending application Ser. No. 451,351, supra. As described in U.S. Pat. No. 3,755,099 the cell cavity accomodates a sump for removing the molten metal which accumulates therein below the salts and fluxes normally used in such cells. The cell is enclosed by a refractory roof made of a spinel phosphate bonded castable. The cell roof is provided with a port for tapping the molten metal in the layer of molten metal by insertion of a pump. A second port in the roof provides for feeding the salts to the bath and a third port provides an outlet for venting chlorine. Such a cell is referred to as bipolar cell because the electrodes within the cell consist of a metal electrode and carbonaceous electrode alternating throughout the length of the cell or depth of the cell cavity, depending on the alignment of the cell. Means are provided for supplying a direct current to the electrodes. In the case of magnesium, the carbonaceous electrode is the anode and in the case of aluminium, it is the cathode. Operation of such a magnesium bipolar cell for approximately six months with some bricks made of spinel and some brick joints mortared with the phosphate-spinel mortar has shown the technical superiority of the spinel refractories compared to alumina castables and alumina silica mortars and bricks in the same cell.

In a third representative example, a phosphate bonded spinel mortars of example numbers 5 and 6 of our copending U.S. application Ser. No. 541,351 now abandoned were used between blocks of fusion cast sodium beta alumina refractory in the side wall of several different cells of the general configuration shown in KIRK OTHEMER, Volume 14, page 579, FIG. 2. The spinel mortar was used to lay up the brick in the cell shown in Kirk Othmer. In several tests lasting six to twelve months this mortar proved far superior to the conventional alumina silica or phosphate bonded alumina mortars commercially available. The latter were typically blackened and crumbling after the test period, while the spinel mortars were white and had to be removed with hammers and chisels.

In a fourth representative example, a fusion cast spinel block, manufactured by Carborundum for this purpose, was used in the refractory side wall of a cell such as shown in Kirk Othmer, supra. After an in-service period over one year the block was removed. The performance was markedly superior to that of fusion cast sodium beta alumina making up the remainder of the refractory. The spinel block exhibited no significant dimensional change, only insignificant thermal shock cracking and no chemical attack. Sodium beta alumina exposed for this length of time, under the same conditions, exhibits (1) swelling with intrusion of bath salts; (2) thermal/mechanical fracturing and (3) partial chemical conversion to spinel and aluminum metal with migration of the sodium oxide component.

We claim:

1. In the electrochemical light metal production cell requiring refractory components within the cell the improvement which comprises using as the refractory components of said cells a spinel composed of magnesium aluminum oxide produced from powders of heat densifiable $MgAl_2O_4$ or fusion casting of MgO and $Al_2O_3$ in a ratio of 1 to 2.

2. An electrochemical cell for light metal production requiring refractory components in which the refractory employed contains or is composed of magnesium aluminum oxide spinel derived by fusion casting said components from mixtures of magnesium and aluminum oxides.

3. An electrochemical cell for light metal production requiring refractory components in which the refractory employed contains or is composed of magnesium aluminum spinel derived from pressed, extruded or caset, calcined or sintered reactive spinel powders which powders may also contain aggregates selected from the group consisting of sintered spinel or alumina or alumina-silica powders and/or spinel/phosphate bonding mortar, which pressed, extruded or cast shapes are thereafter subjected to temperatures at or above the operating temperatures such shapes will experience in service.

4. Molten metal handling, melting and transfer system components lines with or composed of spinel which refractory employed contains or is composed of magnesium aluminum spinel derived from pressed, extruded or cast, calcined or sintered reactive spinel powders which powders may also contain aggregates selected from the group consisting of sintered spinel or alumina or alumina-silica powders and/or spinel/phosphate bonding mortar, which pressed, extruded or cast shapes are thereafter subjected to temperatures at or above the operating temperatures such shapes will experience in service.

* * * * *